Patented Oct. 25, 1949

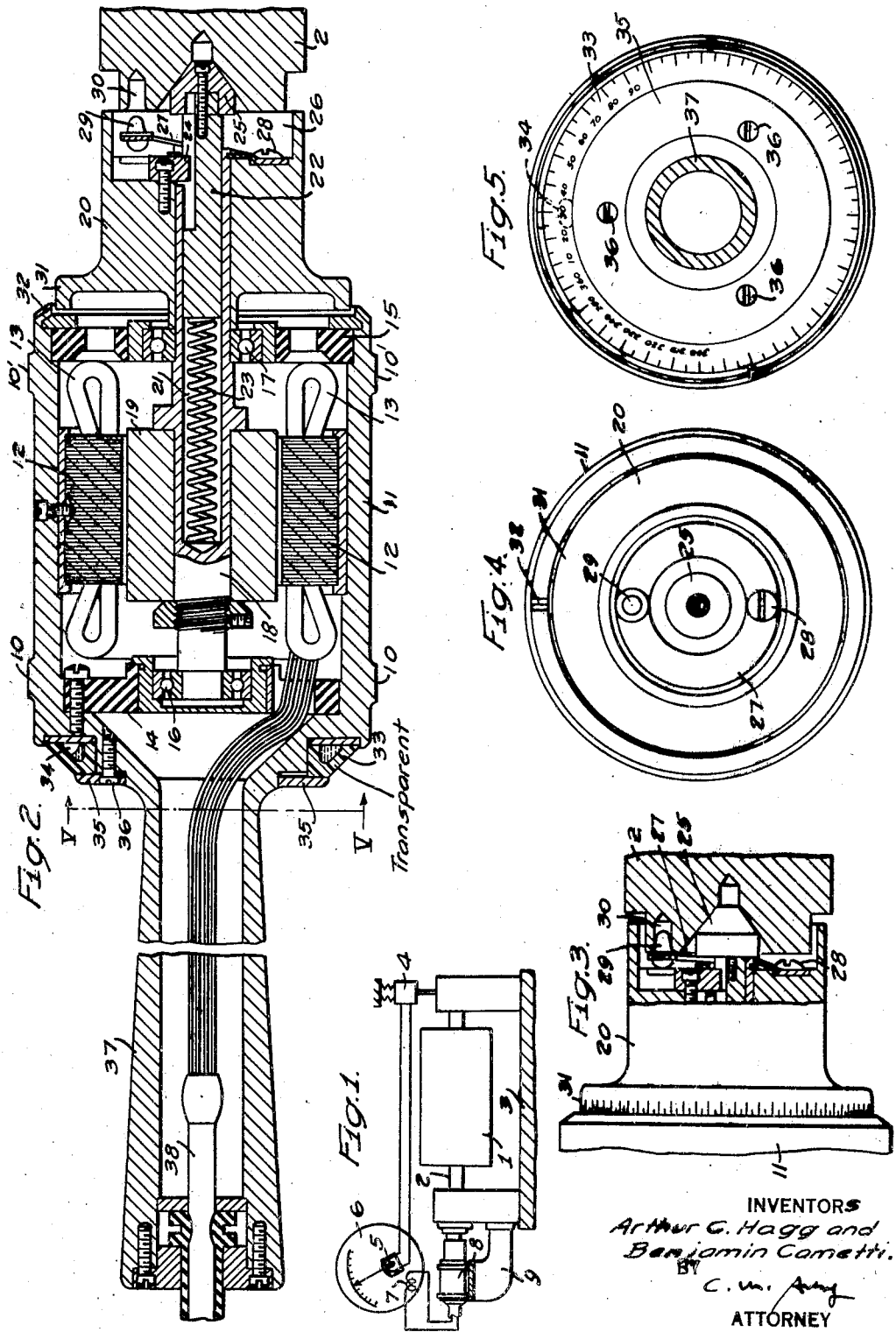

2,486,277

UNITED STATES PATENT OFFICE 2,486,277

PORTABLE GENERATOR FOR THE BALANCING OF ROTORS

Arthur C. Hagg and Benjamin Cametti, Pittsburgh, Pa., assignors to Westinghouse Electric Corporation, East Pittsburgh, Pa., a corporation of Pennsylvania Application June 12, 1948, Serial No. 32,584

5 Claims. (Cl. 171—209)

Our invention relates to portable generators for providing a synchronous voltage as required for detecting or measuring unbalance of rotating structures.

It is an object of the invention to provide alternating-current generators that can easily be coupled with and disengaged from a structure to be tested for balance while the structure is in rotation, and that not only secure a fixed angular relation between rotating structure and generated voltage but also permit an easy calibration of this phase relation for any given operating speed so as to compensate for any electric phase shift that otherwise may falsify the indication.

To achieve these objects, a generator according to the invention is equipped with a friction coupling and an associated positive-engagement clutch, and has an indicating protractor whose angular relation to the generator housing can be set for any desired operating speed so as to compensate for phase shift due to generator impedance. Preferably, another protractor is provided in fixed relation to the positive-engagement clutch and in proximity of the driven generator end to facilitate locating the position of the unbalance on the rotor to be tested.

These and other objects and features of the invention will be apparent from the following description in conjunction with the accompanying drawing, in which:

Figure 1 shows schematically a generator according to the invention applied for determining the angular location of an unbalance of a rotor according to a watt-metric detecting method;

Fig. 2 shows an axial section through the generator;

Fig. 3 shows the clutch portion of the same generator partially in section and with the clutch in fully coupled position;

Fig. 4 is a view of the generator from the right-hand side of Fig. 2; and

Fig. 5 is a partially sectional view of the generator from the left-hand side of Fig. 2.

Figure 1 is mainly explanatory, and serves to exemplify one of the balancing methods for which a generator according to the invention can be applied.

According to Fig. 1, a rotor 1 to be tested for balance has its shaft 2 journaled in the bearings of a supporting structure 3. The vibrations of the bearings caused by an unbalance of the rotor when it is being driven at the testing or operating speed are sensed by an electromagnetic pickup 4 whose output voltage is applied to the voltage coil 5 of a wattmetric instrument 6. The current coil 7 of this instrument is connected to a sine wave generator 8 according to the invention. The generator has its armature coupled with the shaft 2 of the rotor so as to maintain a fixed and known phase relation to the rotor. As explained below, the generator may be held by hand against the shaft. If desired, however, the generator may also be secured to the machine frame structure, for instance, by a support or bracket 9 as shown in Fig. 1.

While the rotor is rotating, the angular position of the generator housing may be changed so as to change the phase location of the generated voltage with respect to a fixed or zero degree position in the rotor.

The wattmeter measures and indicates the product of the pickup voltage times the current supplied from the generator times the cosine of the phase angle between the voltage and the current. Now, if the generator is angularly adjusted so as to make the phase angle ninety degrees, the wattmeter will read zero because the cosine of the phase angle is zero. The setting for ninety degrees phase location is very critical, and therefore affords an accurate indication of the phase of the pickup voltage which can be interpreted in the balancing operation as the angular location of the unbalance.

By switching the current coil of the wattmeter to a stator winding in the sine wave generator which is ninety degrees out of phase with the stator winding previously effective, the wattmeter can be used as a means of measuring the amount of vibration which can be interpreted in the balancing operation as amount of unbalance.

The just-mentioned wattmetric method of indicating unbalance requires, of course, that the coupling between the generator and the rotor shaft secure a fixed and predetermined relation between the two, despite the fact that the generator is separable from the rotor and may be coupled thereto while the rotor is running. A second requirement is that the output voltage of the generator maintain a predetermined and invariable phase relation to the rotation of the generator armature. Due to the impedance of the generator circuits, the phase relation between output voltage and rotation of the generator armature depends somewhat on the operating speed of the generator. Consequently, the phase indication is accurate only for a given operating speed for which the generator is calibrated.

As will be explained with reference to Figs. 2 through 5, the generator according to the invention is designed to secure a fixed phase relation between the rotor to be tested and the armature of the generator, and it also permits calibrating the angle-indicating means of the generator for any desired operating speed merely by changing the adjustment of a protractor device associated with the generator.

According to Figs. 2 through 5, the generator has a substantially cylindrical housing 11 which carries in its interior the magnetic field system 12 and the appertaining field coils 13. The housing has machined surfaces at 10 and 10' which can be used for guiding or clamping the generator in proper position, for instance, on the bracket 9 shown in Fig. 1. Two bearing plates 14 and 15 are attached to the generator housing and equipped with ball bearings 16 and 17, respectively, in which the generator shaft 18 is journaled. The bearing plates are made, at least partly, of insulating material to prevent current from flowing through the bearings and spoiling them. The generator armature 19, consisting of a permanent magnet, is firmly secured to the shaft 18. Mounted on the shaft outside the housing 11 is a substantially cylindrical body 20. An axial bore 21 of shaft 18 serves as a guide for a slidable pin 22 which bears against a helical compression spring 23 and can be pushed into the shaft 18 in opposition to the spring. A key 24 mounted on the body 20 engages a slot of pin 22 in order to prevent it from revolving relative to the shaft 18. Key 24 also serves to angularly secure body 20 to shaft 18. Mounted on the pin 22 is a conical friction prod 25 for engagement with a conical center bore of the rotor shaft 2.

The body 20 has a cup-shaped cavity 26 receding from its exterior front surface. A flat ring-shaped spring 27 is disposed in the cavity 26 and is at one point firmly secured to the bottom of the cavity by means of a screw 28. The diametrically opposite point of the annular spring 27 carries a clutch dog 29 and is bent away from the bottom of the cavity 26 in order to permit the dog 29 a resilient movement toward the cavity bottom. The dog 29 serves to engage a hole 30 drilled into the front face of the rotor shaft 2.

The body 20 has a portion of wider diameter which carries on the surface of its peripheral portion 31 a protractor calibration (see Fig. 3). An indicating mark or notch 32 is provided at the generator housing 11. Another protractor is disposed at the other side of the housing 11. This other protractor comprises a transparent ring-shaped and hollow body 33, for instance, of resinous material. The body is filled with liquid so as to leave only an air bubble 34. Protractor body 33 is displaceable relative to the housing 11 and is fastened to the housing in a properly calibrated position by means of a ring 35 screwed against the housing with screws 36.

The housing 11 extends into a handle portion 37 which surrounds the outgoing leads from the generator field coils.

When the generator is to be coupled with the shaft of a rotating rotor, the operator, holding the generator at its handle 37, forces the friction prod 25 against the center bore of the shaft 2. When frictional contact is established, the shaft 2 entrains the prod 25, thus revolving the shaft 18 and the armature 19. The armature thus accelerates to full speed while the generator is being slowly pushed toward the shaft 2 and while the pin 22 is receding into the shaft 18. Eventually, the dog 29 touches the front surface of shaft 2 and, after some sliding movement, enters into the bore 30. When the generator is fully forced against the shaft 2, the generator armature is coupled with the rotor shaft, and the phase position of the armature is fixed by the fact that only one bore 30 is available and is securely engaged by the dog 29.

It has been found that a coupling of the above-described design and performance facilitates engaging and disengaging the generator without requiring the rotor to be stopped and without causing damage to the shaft end of the rotor or to the parts of the generator. Consequently, the generator can readily be used for testing rotating equipment while the equipment is in normal operation.

As explained in the foregoing, the housing of the generator is to be rotated by the operator until the indication of the wattmetric device (6 in Fig. 1) is zero. When that position is reached, the air bubble 34 indicates an angle on the protractor device 33. This angle can be interpreted in terms of the angular position in which an unbalance occurs in the tested rotor relative to the radial plane of the vibration pickup and with reference to a fixed angular phase position identified by the location of the bore 30. If there were no variable phase displacement between the generated voltage and the rotation of the generator armature, the protractor device 33 would give a reliable indication even if it were immovably fixed to the housing 11. However, as mentioned, there is some phase displacement which varies with the operating speed of the generator due to the influence of the internal generator impedance. Due to the fact, however, that the protractor body 33 is angularly adjustable with respect to the housing 11, the generator can readily be calibrated for any desired testing or operating speed; and the protractor body 33 can then be fixed to the housing in the properly calibated position.

The protractor markings at the peripheral portion 31 of body 20 facilitate locating the angular position of the unbalance in the tested rotor. That is, after the angular location has been read off from the protractor device 33, the tested rotor can be stopped, the generator again be coupled with the arrester rotor, and the protractor at 31 can then be used to find the angular location of the place where material has to be added or removed in order to balance the rotor.

It will be apparent to those skilled in the art that generators according to the invention can be modified as regards construction or design and relative to the location of the appertaining protractor means without departing from the objects and essential features of the invention and within the scope of the claims attached hereto.

We claim as our invention:

1. A portable generator for balancing purposes, comprising a housing having field windings and appertaining output leads, an armature revolvable in said housing and having a shaft with an axial bore, a compression spring in said bore, a pin axially movable in said bore in opposition to said spring, said pin having a friction prod at the one end of said member outside said bore and being keyed to said shaft, a flat annular spring member surrounding said pin and being attached at one point to said armature, said member having a clutch dog mounted at another point diametrically opposite said point of attachment and resiliently projecting away from said armature at said other point in order to have said clutch dog positively engage the rotor to be tested when said prod is forced toward said housing by pressing said housing against the rotor.

2. A portable generator for balancing purposes, comprising a housing having field windings and appertaining output leads, an armature revolvable in said housing and having a shaft with an axial bore, a substantially cylindrical body firmly mounted on said shaft adjacent to said housing and having a substantially cup-shaped cavity at its axial end away from said housing, a compression spring in said bore, a pin movable in said bore against said spring and extending through said cavity, said pin being keyed to said shaft and having a friction prod at the pin end outside said bore, a ring-shaped flat spring surrounding said pin and being fastened at one point to the bottom of said cavity, a clutch dog mounted on said flat spring at a point diametrically opposite said point of attachment, and said flat spring being shaped to resiliently project away from said cavity bottom.

3. A portable generator for balancing purposes, comprising a housing having field windings and appertaining output leads, an armature revolvable in said housing, a coupling connected with said armature for driving said armature from structure to be balance tested and having a single clutch dog engageable with the structure for securing a fixed phase position of said armature relative to the structure, an indicating protractor displaceable relative to said housing about the geometric axis of said armature, and fastening means for securing said protractor to said housing in an adjusted fixed angular relation thereto to permit calibrating the phase position of the generator voltage relative to that of said dog for a desired speed.

4. A portable generator for balancing purposes, comprising a housing having a handle at one end and enclosing field windings with output leads, an armature revolvable in said housing and having a positive-engagement clutch disposed at the other end of said housing and having a single clutch means engageable with a rotor to be tested in a given phase position relative to the rotor, an indicating protractor disposed on said housing at the handle end to be visible by the operator holding said handle, said protractor being angularly displaceable relative to said housing about the geometric axis of said armature, and fastening means for securing said protractor to said housing in an adjusted fixed angular relation thereto to permit calibrating the phase position of the generator voltage relative to that of said clutch means for a desired revolving speed.

5. A portable generator for balancing purposes, comprising a housing having field windings and appertaining output leads, an armature revolvable in said housing and having a positive-engagement clutch engageable with a rotor to be tested in a given phase position of the rotor, an indicating protractor disposed on said housing and comprising a hollow transparent and circular body with protractor markings and a body of liquid and an air bubble within said body, said body being concentric to said housing and angularly displaceable relative thereto, and fastening means for firmly securing said body to said housing in an adjusted fixed position relative to said housing to permit calibrating the phase position of the generator voltage relative to said given phase position for any desired rotor speed.

ARTHUR C. HAGG.
BENJAMIN CAMETTI.

REFERENCES CITED

The following references are of record in the file of this patent:

UNITED STATES PATENTS

| Number | Name | Date |
| --- | --- | --- |
| 1,293,053 | Donnelly | Feb. 4, 1919 |
| 1,817,597 | Zabriskie | Aug. 4, 1931 |
| 1,999,303 | Sarbey | Apr. 30, 1935 |
| 2,315,578 | Baker | Apr. 6, 1943 |